June 3, 1941.  L. M. THOMPSON  2,244,408
FULCRUM ATTACHMENT FOR FISHING RODS
Filed March 5, 1940
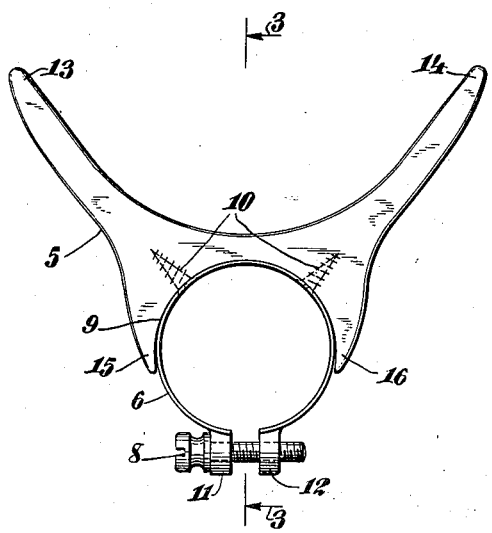
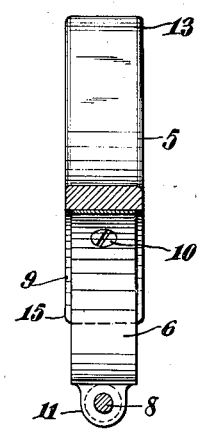
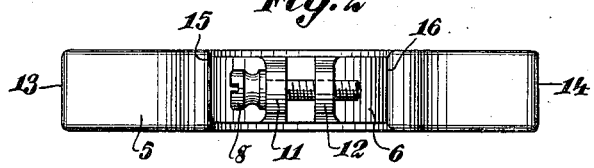
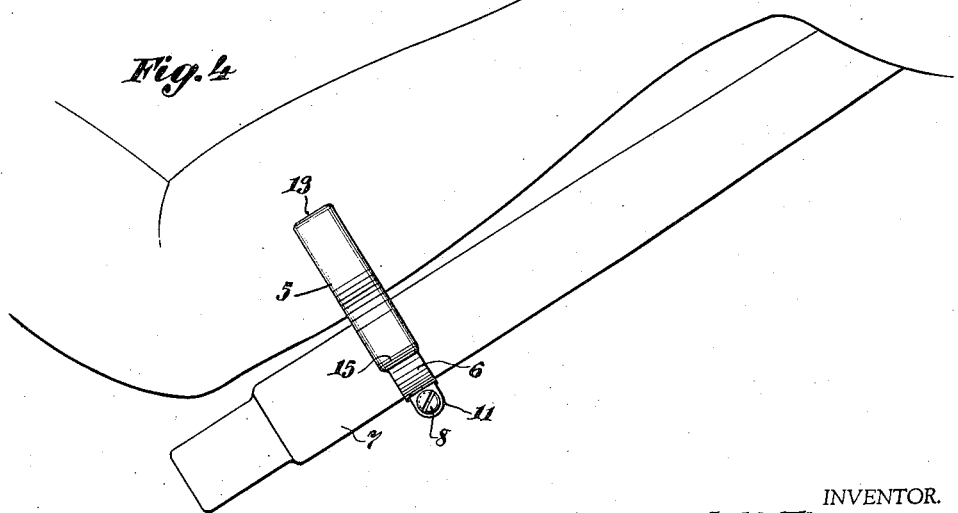
INVENTOR.
L. M. Thompson,
BY
ATTORNEY.

Patented June 3, 1941

2,244,408

UNITED STATES PATENT OFFICE 2,244,408

FULCRUM ATTACHMENT FOR FISHING RODS

Lucius M. Thompson, Miami, Fla.

Application March 5, 1940, Serial No. 322,281

1 Claim. (Cl. 43—25)

The invention here disclosed relates to fishing rods and particular objects of the invention are to provide a device quickly attachable to a fishing rod to form a fulcrum engageable beneath the forearm adjacent the elbow and which when so placed, will enable the user to hold the rod steady and against slipping or twisting while reeling in a fish on the line.

Further objects of the invention are to provide a device of the character mentioned, which will be of light weight, so as not to burden or upset the balance of the rod, which will fit the arm comfortably and not tire the user, which can be produced at low cost and which with its other mechanical advantages will be ornamental and attractive in appearance.

The foregoing and other desirable objects are attained by certain novel features of construction, combinations and relations of parts, all as set forth in the following specification, broadly covered in the claim and illustrated in the accompanying drawing.

In the drawing, a single commercial embodiment of the invention is illustrated, but it should be understood that the structure may be varied as regards this particular illustration, all within the true spirit of the invention as hereinafter described and claimed.

Fig. 1 is a face view of the attachment.

Fig. 2 is an edge view of the same.

Fig. 3 is a sectional view as on line 3—3 of Fig. 1.

Fig. 4 is a broken diagrammatic view illustrating use of the invention on a fishing rod.

In Fig. 1, the device is shown as consisting in the main of a U-shaped bracket 5, of a proper concavity to form a comfortable seat for the underside of the forearm adjacent the elbow, substantially as indicated in Fig. 4.

This arm receiving seat or rest is attached to the lower end of the rod, in the illustration, by means of a clamp band 6, which can be closed over the grip portion 7, of the rod by means of a band closing screw 8.

The contractible clamp band is shown as secured in the part circular seat 9, in the underside of the rest or pad member 5, by means of screws 10, but it will be appreciated that the type of fastenings or method of securing the clamp band to the rest may vary according to materials employed and other circumstances.

The U-shaped arm seat may be made of wood, plastic or other materials.

The clamp may be a light metal strap carrying at one end an abutment terminal 11, and at the opposite end a nut terminal 12, for the contracting screw 8. This clamp may have a range of adjustment to fit the different sizes of rod grips ordinarily in use.

The rest is quickly attached to or removed from the rod. It is relatively small and light in weight and does not detract at all from the appearance or interfere with normal use of the rod.

Normally the arm rest will be secured at a point close to the end of the rod, so as to provide a fulcrum for the rod near to the elbow. The forearm is thus given sufficient leverage to hold and manipulate the rod without tiring.

The sides 13, 14, of the U-shaped fulcrum piece reach up about the sides of the forearm sufficiently to center and balance the pole under the forearm and to hold the rod against twisting or slipping from position. This holding the rod against twisting relieves the hand of much strain and makes it possible for the one hand to hold the rod under all usual circumstances, leaving the other hand free to manipulate the reel.

While the shape of the fulcrum piece shown has been found wholly practical and desirable, it is realized that such shape may be varied, for instance, made with a different curvature or the horns 13, 14, be of the same or unequal length, longer or shorter than shown, or the like. Also, instead of projecting, when mounted on the rod substantially at a right angle to the axis of the rod, as shown, the fulcrum seat may be canted or arranged at other than a right angle, to receive and cup the forearm as may seem most comfortable or serve the best fulcrum purposes.

By securing the flexible clamping band only at the top as indicated at 10, in Figs. 1 and 3, the sides of this band are left free to contract as much as required for proper gripping engagement with the handle portion of the rod.

The side portions 15, 16, Fig. 1, projecting downward from the side horns of the device strengthen and brace the latter so that they can be made relatively light and thin.

In some instances, it may be found desirable to attach the fulcrum piece permanently to the rod. In such event, the clamp is unnecessary and the U-shaped member can then be permanently secured to the handle, as by means of screws or other suitable fastenings.

In another embodiment of the invention, the rod handle and the fulcrum are molded in plastic material in one single integral piece. In this form, the crotch of the fulcrum can be brought right down to the surface level of the handle, enabling the underside of the arm to contact and bear on the top of the handle for some distance, thus distributing the pressure on the arm and avoiding concentrating the load all at one point.

What is claimed is:

A fishing rod attachment, comprising a one-piece U-shaped fulcrum piece having a concavity to receive the underside of the forearm and upwardly projecting horns at the sides to engage the sides of the forearm, said fulcrum piece having a reverse, downwardly open, part circular concavity directly below the U-shaped portion, a flexible, contractible clamping band engaged and seated in said downwardly open concavity, means securing the intermediate portion of said band in the upper portion of said concavity, the lower portion of the band below said upper secured portion being free to permit adjustable contraction of the same to fit different sized fishing rod handles, the lower free portion of said clamping band projecting below the open seat in which the band is secured and terminating in opposed end portions and screw means for drawing said opposed end portions of said flexible clamping band together into yielding gripping engagement with a fishing rod handle.

LUCIUS M. THOMPSON.